Oct. 10, 1939.   F. MERTENS   2,175,635
FISH LURE
Filed July 21, 1938
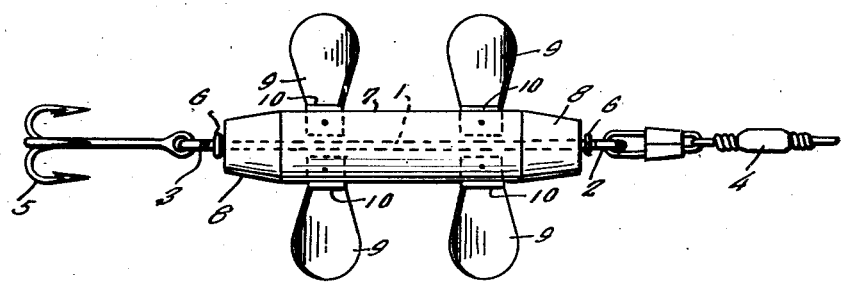
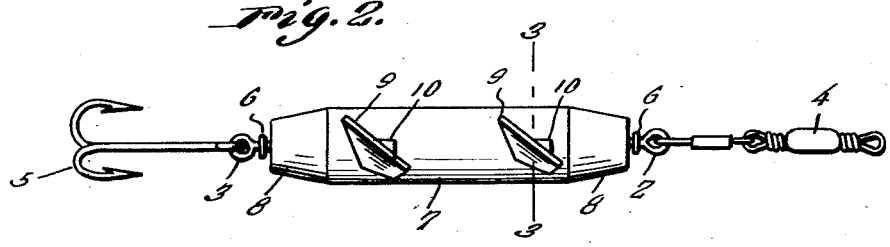
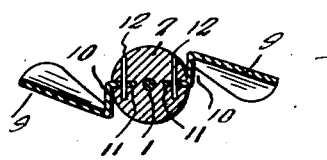
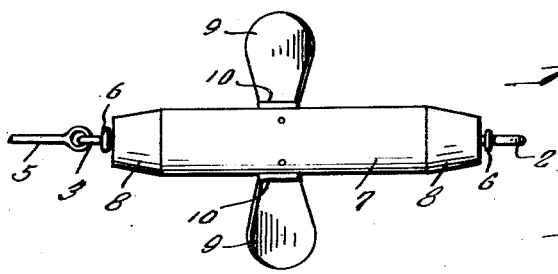
Inventor
Frank Mertens
By Clarence A. O'Brien
and Hyman Berman
Attorneys Patented Oct. 10, 1939

2,175,635

UNITED STATES PATENT OFFICE 2,175,635

FISH LURE

Frank Mertens, Staples, Minn.

Application July 21, 1938, Serial No. 220,579

1 Claim. (Cl. 43—47)

The present invention relates to new and useful improvements in fish lures and has for one of its important objects to provide, in a manner as hereinafter set forth, a device of this character embodying a novel construction and arrangement whereby said device will be caused to rotate rapidly as it is drawn through the water thereby materially increasing its attractiveness to the fish.

Other objects of the invention are to provide a fish lure of the aforementioned character which will be comparatively simple in construction, strong, durable, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a plan view of an embodiment of the invention.

Figure 2 is a view in side elevation thereof.

Figure 3 is a cross sectional view, taken substantially on the line 3—3 of Fig. 2.

Figure 4 is a plan view of another form of the device.

Referring now to the drawing in detail, it will be seen that the reference numeral 1 designates a shaft of suitable metal having eyes or loops 2 and 3 on its ends. A swivel 4 provides means for connecting a line to the forward eye 2. A gang hook 5 is connected to the rear eye 3.

Adjacent the eyes 2 and 3, the shaft 1 is provided with stop collars or beads 6. Rotatably mounted on the shaft 1 between the collars 6 is an elongated plug or body 7 of suitable material, preferably wood. The body 7 is of circular cross section and said body includes substantially frusto-conical end portions 8.

Pairs of metallic blades 9 are mounted at longitudinally spaced points on the body 7 and project laterally therefrom. As illustrated to advantage in Fig. 3 of the drawing, each blade 9 includes an integral arm 10 extending at an acute angle relative to the main portion of the blade and terminating in an inturned apertured ear 11 embedded in the body 7 and anchored therein through the medium of a pin 12.

It is thought that the manner in which the device functions will be readily apparent from a consideration of the foregoing. As the lure is drawn through the water in the usual manner the plug or body 7 is caused to rotate rapidly by the blades 9. Of course, the body 7, also the blades 9, may be painted any color or combinations of colors for increasing the attractiveness of the device to the fish. For example, one side of the metallic blades 9 may be highly polished in a manner to provide shiny or reflecting surfaces while the other sides of said blades may be painted. The lure has been found to be particularly effective in attracting and catching pickeral, pike, muskies, bass, etc.

In the slight modification shown in Fig. 4 of the drawing, a single pair of the blades 9 is provided on the plug or body 7 of the lure. In other respects this form of the invention is substantially similar in construction and operation to that shown in Figs. 1, 2 and 3.

It is believed that the many advantages of a fish lure constructed in accordance with the present invention will be readily understood and although preferred embodiments of the device are as illustrated and described, it is to be understood that further modifications and changes in the details of construction may be resorted to which will fall within the scope of the invention as claimed.

What is claimed is:

A fish lure comprising an elongated, rotatable body of circular cross section, a pair of substantially flat, oppositely inclined blades mounted on opposite sides of said body at an intermediate point for rotating said body as it is drawn through the water, said blades including integral arms extending at an acute angle from the inner ends of the main portions of the blades, inturned ears integral with one end of the arms embedded in the body on opposite sides of the shaft and extending in the longitudinal plane of said body, and pins mounted in the body and extending through the ears for anchoring said ears in the body.

FRANK MERTENS.